US007140752B2

(12) United States Patent
Ashdown

(10) Patent No.: US 7,140,752 B2
(45) Date of Patent: Nov. 28, 2006

(54) CONTROL SYSTEM FOR AN ILLUMINATION DEVICE INCORPORATING DISCRETE LIGHT SOURCES

(75) Inventor: Ian Ashdown, West Vancouver (CA)

(73) Assignee: TIR Systems Ltd., Burnaby (CA)

( * ) Notice: Subject to any disclaimer, the term of this patent is extended or adjusted under 35 U.S.C. 154(b) by 15 days.

(21) Appl. No.: 10/897,990

(22) Filed: Jul. 22, 2004

(65) Prior Publication Data

US 2005/0062446 A1    Mar. 24, 2005

Related U.S. Application Data

(60) Provisional application No. 60/489,389, filed on Jul. 23, 2003.

(51) Int. Cl.
*F21V 23/04* (2006.01)
(52) U.S. Cl. .................................. 362/276; 315/316
(58) Field of Classification Search ................ None
See application file for complete search history.

(56) References Cited

U.S. PATENT DOCUMENTS

| 5,350,977 | A | 9/1994 | Hamamoto | 315/291 |
| 5,761,383 | A * | 6/1998 | Engel et al. | 706/14 |
| 6,127,783 | A | 10/2000 | Pashley et al. | 315/149 |
| 6,411,046 | B1 | 6/2002 | Muthu et al. | 315/309 |
| 6,441,558 | B1 * | 8/2002 | Muthu et al. | 315/149 |
| 6,448,550 | B1 | 9/2002 | Nishimura | 250/226 |
| 6,507,159 | B1 | 1/2003 | Muthu | 315/307 |
| 6,552,495 | B1 | 4/2003 | Chang | 315/169.3 |
| 2003/0006170 | A1 * | 1/2003 | Lawandy | 209/3.3 |

FOREIGN PATENT DOCUMENTS

WO    WO 02/080625 A1    10/2002

WO    WO 03/053108 A1    6/2003

OTHER PUBLICATIONS

Ashdown, I., Neural Networks for LED Color Control, Proc. SPIE, vol. 5187, Third International Conference on Solid State Lighting, Bellingham, Washington, p. 215-226.
Haykin, S., Neural Networks: A Comprehensive Foundation, 2nd Edition, Prentice Hall (1999).
Leonardis, et al., An Efficient MDL-Based Construction of RBF Networks, Neural Networks 11:963-973 (1998).
Lowe, D., Adaptive Radial Basis Function Nonlinearities, and the Problem of Generalization, First IEEE International Conference on Artificial Networks. pp. 171-175 (1989).

(Continued)

*Primary Examiner*—Renee Luebke
*Assistant Examiner*—Julie A. Shallenberger
(74) *Attorney, Agent, or Firm*—Pillsbury Winthrop Shaw Pittman LLP

(57) ABSTRACT

The present invention provides an illumination system enabling dynamic color control of the illumination produced by the system. The illumination system comprises light-emitting elements for producing illumination, and at least one detecting device which collects information relating to the illumination, which is inherently non-linear. The illumination system also integrates a computing system which receives the information from the at least one detecting device and linearises this information using a multivariate function having a solution defining a hyperplane representing constant chromaticity for a given luminous intensity, and then determines a number of control parameters based on the information. The illumination system also integrates a controller for receiving the control parameters from the computing system and determining the control signals to be sent to the light-emitting elements in order to dynamically alter the characteristics of the illumination based on the collected information and the desired illumination result.

12 Claims, 3 Drawing Sheets

OTHER PUBLICATIONS

Orr, M.J.L., Introduction to Radial Basis Function Networks, Technical Reort, Centre for Cognitive Science, University of Edinburgh, pp. 1-67 (1996).

TAOS TCS230 Color Sensor produced by Texas Advanced Optical Solutions, Inc. in Plano, Texas.

* cited by examiner

CONTROL SYSTEM FOR AN ILLUMINATION DEVICE INCORPORATING DISCRETE LIGHT SOURCES

This application claims priority to U.S. Application No. 60/489,389, filed Jul. 23, 2003

FIELD OF THE INVENTION

The present invention pertains to the field of illumination control, and in particular to a control system for an illumination device incorporating discrete light sources.

BACKGROUND

Polychromatic light sources with independent intensity controls can offer the ability to generate any colour within the colour gamut of the constituent light sources. An example is a solid-state light fixture with red, green, and blue (RGB) light emitting diodes. There are a number of control systems that enable the control of a luminaire incorporating a plurality of different emission colour light sources. These control systems provide a means for the manipulation of the resultant blended illumination based on a desired illumination level.

For example U.S. Pat. No. 5,350,977 discloses a luminaire of variable colour temperature which includes a plurality of light sources of different emission colours which are lighted by a lighting means. The emission colours of the respective light sources are blended for emission of a blended colour light from the luminaire. The control means transmits a colour temperature control signal to the lighting means for varying the manner in which the emission colours are blended. The signal transmission from the control means to the lighting means is carried out such that the respective differences in the reciprocal colour temperatures (mireks) of the two adjacent stages of the colour temperature control signals are substantially equalised.

A method of automatically measuring the spectral content of a LED light source and controlling the spectral content based on that measurement with reference to a desired spectral content is disclosed in U.S. Pat. No. 6,448,550. The spectral content of a solid state illumination source composed of LED sources of different colours is measured by photosensors mounted in close proximity to the sources. The results of these measurements are used to control the spectral content of the blended light by varying the current to the different colour LEDs. The photosensors associated with the system can collect mixed light thus each colour of LED need not be measured separately. A desired spectral content is selected and the actual spectral content can be measured and adjusted to match the desired levels.

U.S. Pat. No. 6,127,7783 discloses a system where the combined light output or chromaticity, of a white light emitting LED luminaire is electronically controlled based on measurements by a single photodiode arranged to measure the light outputs of all the LEDs in the array. The light output of the LEDs in each colour is separately measured using a sequence of time pulses. During each time pulse, the current for the colours not being measured is turned off. The response time of a photodiode is short enough that the measurement can be taken in less time than what can be observed by the human eye. The measured light outputs for the colours are compared to desired outputs, which may be set by user controls, and changes to the power supply for the colour blocks are made as necessary.

U.S. Pat. No. 6,507,159 discloses a control system for an RGB LED luminaire that compares the feedback tristimulus values representing the mixed light output of an RGB LED luminaire with the referenced tristimulus values representative of the desired emitted light. The control system adjusts the forward currents of the LED luminaire such that the difference between these tristimulus values is decreased to zero. Particularly, the controlling system comprises a feedback unit including photodiodes for generating the feedback tristimulus values of the LED luminaire, and a controller for acquiring the difference between the feedback tristimulus values and the desired reference tristimulus values. The controller generates control voltages for adjusting the forward currents of the LED luminaire so that the difference between these tristimulus values is decreased to zero. The tristimulus values under comparison may be under the CIE 1931 tristimulus system or under a new RGB colourimetric system. Under a steady state where the feedback tristimulus values follow the desired reference values, the light produced by the RGB LED luminaire has the desired target colour temperature and lumen output, which can be regulated to the targets regardless of the variations in junction temperature, forward current and ageing of the LEDs in the RGB LED luminaire.

An RGB LED controller system that employs a feedback control arrangement that substantially corrects all colour point errors without visual perception of change in colour is disclosed in U.S. Pat. No. 6,552,495. This control system comprises a sensor responsive to light generated by the LEDs to measure the colour co-ordinates of the generated light, wherein the colour co-ordinates are defined in a CIE(x, y, z) colour space. A transformation module is connected to the sensor to transform the co-ordinates of the generated light to a second colour space, such as an (x', y') colour space, in accordance with a Farnsworth transformation. A reference module is configured to provide reference colour co-ordinates corresponding to the desired light, expressed in the second colour space. An error module is coupled to the transformation module and the reference module and this error module are configured to generate an error colour co-ordinate corresponding to the difference between the desired white light colour co-ordinates and the generated white light colour co-ordinates. A driver module is coupled to the error module and is configured to generate a drive signal for driving the LEDs in response to this difference.

U.S. Pat. No. 6,441,558 discloses a controllable white LED luminaire using red, green and blue LEDs. A light control system is configured to maintain the colour temperature and the lumen output level of the emitted white light. The control system comprises a feed-forward temperature compensation arrangement and an optical feedback control system to maintain the target white light. The junction temperature and the light output of the LEDs are sensed and are fed into the light control system. The temperature feed-forward compensation system corrects the deviation in the target colour temperature and the colour-rendering index of the white light. A processing means, such as a feed-forward temperature compensator means, is configured to provide required lumen output fractions of the RBG light sources in response to the junction temperature of the LEDs and the target white light. A lumen output model in combination with a lumen output controller are configured to maintain the light output generated from the LED light source equal to the light output value provided by the feed-forward temperature compensator, regardless of junction temperature, ageing and batch-to-batch variation of the LEDs.

The luminous intensity of LEDs is however dependent on their spectral distribution, junction temperature, drive current, non-linear luminous flux output characteristics, peak wavelength shifting and spectral broadening characteristics, device ageing and manufacturing tolerances which include for example binning for peak wavelength, luminous intensity and forward voltage. As such a successful design of a control system for such a lighting system would include optical feedback from a sensor that monitors both colour and intensity as is outlined in the prior art. However, this scenario introduces additional design issues such as variations in colour sensor spectral responsivities, sampling rates, and feedback loop response times. In addition, approximations are introduced by linear colour spaces when translating the sensor signals into a model of human colour vision, for the perceived illumination. A typical approach to such a problem is to implement a proportional integral-derivative (PID) controller whose feedback control signal is a weighted sum of the instantaneous error, the integral of the error, and the derivative of the error, wherein this approach implicitly assumes that the process being controlled is linear. The combination of junction temperature dependencies, square law dimming, and colour space mapping may therefore preclude the effective use of linear PID controllers as is done in the prior art. As such there is a need for a control system for controlling a plurality of discrete light sources having varying peak wavelengths of emissions that can account for these non-linear factors, thereby providing the dynamic control of the lighting system.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a control system for an illumination device incorporating discrete light sources. In accordance with an aspect of the present invention, there is provided an illumination system comprising: a plurality of light-emitting elements for providing illumination having a variety of wavelengths; at least one detecting device for providing information regarding the illumination being created by the light-emitting elements; a computing system for receiving the information from the at least one detecting device and based on a predetermined set of parameters, determining a plurality of control parameters; a controller for receiving the plurality of control parameters and determining a set of control signals, wherein said control signals are sent to the light-emitting elements in order to control the illumination being created; and a power source for providing power to the illumination system.

DETAILED DESCRIPTION OF THE INVENTION

Definitions

Figure 1:
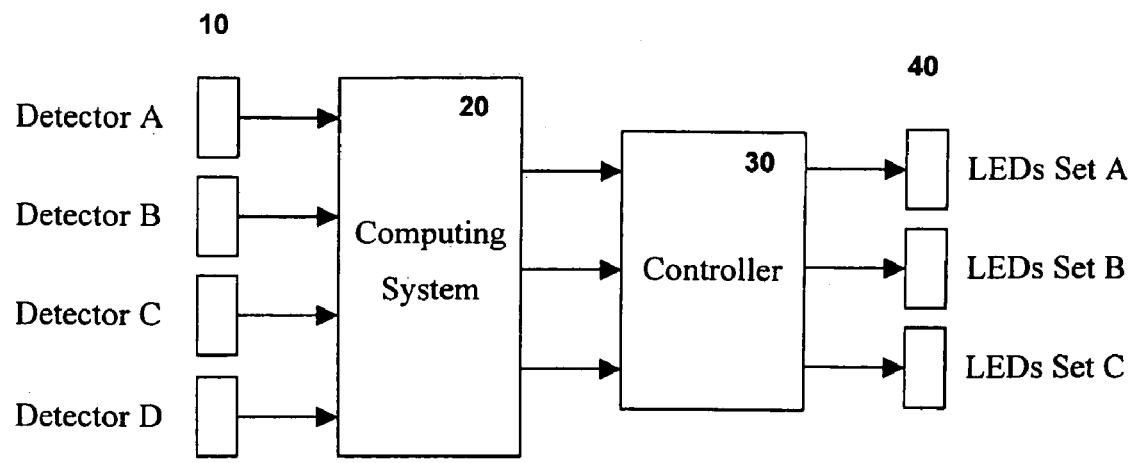
FIG. 1 illustrates an illumination system according to one embodiment of the present invention.

The term "light-emitting element" is used to define any device that emits radiation in the visible region of the electromagnetic spectrum, when a potential difference is applied across it or a current is passed through it. Examples of light-emitting elements include for example, a semiconductor or organic light-emitting diode (OLED) or other similar devices as would be readily understood. It would be obvious to one skilled in the art that electronic devices that emit other forms of radiation such as infrared or ultraviolet radiation may also be used as light-emitting elements if desired in place or in combination with light-emitting elements emitting visible light and are considered to be within the scope of definition of light-emitting elements.

Unless defined otherwise, all technical and scientific terms used herein have the same meaning as commonly understood by one of ordinary skill in the art to which this invention belongs.

The design and implementation of an architectural dimming control for multicolour light-emitting element based lighting fixtures is complicated by the need to maintain a consistent colour balance under a wide variety of operating conditions. Factors to consider include non-linear relationships between luminous flux intensity and drive current, junction temperature dependencies, light-emitting element manufacturing tolerances and binning parameters, device ageing characteristics, variations in colour sensor spectral responsivities and the approximations introduced by linear colour space models. The present invention provides a light-emitting element lighting fixture control system, which provides this non-linear functionality through the use of a non-linear multidimensional function, where maintaining a consistent colour balance is equivalent to determining the hyperplane representing constant chromaticity. This determination of the hyperplane can be performed in real time as the lighting fixture intensity is adjusted, wherein the drive current applied to the light-emitting elements is continuously adjusted in response to detector inputs in order to maintain constant chromaticity for a given intensity setting.

The present invention provides an illumination system enabling dynamic colour control of the illumination produced by the system. The illumination system comprises a plurality of light-emitting elements which create illumination at a number of different wavelengths wherein the colour that can be produced by the illumination system is based on the colour gamut defined by the colours of the individual light-emitting elements being blended, for example the incorporation of light-emitting elements producing red, green and blue illumination provides a relatively broad colour gamut. The system further includes at least one detecting device in order to collect information relating to the illumination being created by the plurality of light-emitting elements, wherein this information can relate to the luminous flux being produced at the various wavelengths. A computing system is integrated into the illumination system, wherein this computing system provides a means for receiving the information from the at least one detecting device and determines control parameters based on a multivariate function having a solution defining the hyperplane representing constant luminous intensity and chroma. Under these conditions the computing system can essentially linearise the information from the detecting device, thereby determining a number of control parameters from the input information, for transmission to a controller. The controller subsequently determines the control signals to be sent to the light-emitting elements in order to control the illumination produced thereby. In this manner, the illumination system according to the present invention can detect the produced illumination and dynamically alter the produced colour or intensity, for example, based on the collected information and the desired illumination result.

FIG. 1 illustrates a schematic of the illumination system according to one embodiment of the present invention. The system comprises one or more detecting devices 10, a computing system 20 for determining control parameters for transmission to the controller 30, wherein the controller produces control signals enabling the adjustment of the illumination produced by the various sets of light-emitting elements 40, thereby providing dynamic colour control.

Light-Emitting Elements

The illumination system comprises a plurality of light-emitting elements that are arranged in one or more arrays on one or more substrates. The light-emitting elements are electrically interconnected to a power source that provides a means for the energization of these elements and a controller provides a means for regulating the supply of power to each light-emitting element thereby controlling the illumination level in addition to activation and deactivation of the light-emitting elements. Additional blending of the illumination produced by the light-emitting elements can be provided by a diffuser or other appropriate optical device associated with the illumination system.

The light-emitting elements incorporated into the illumination system of the present invention, provide illumination in a plurality of wavelengths, wherein the combination of these colours enables the creation of a blended illumination colour, with the potential illumination colours being a result of the colour gamut based on the individual illumination colours produced by the light-emitting elements. The illumination colours produced by different light-emitting elements can be centred around wavelengths of red, green and blue for example. Optionally, light-emitting elements producing further colours can be incorporated into the array, for example light-emitting elements producing illumination centred around the amber wavelength can be integrated into the system. The selection of the light-emitting elements can be directly related to the desired colour gamut in addition to the illumination colours that can be produced by light-emitting elements.

The light emitting elements can be individually controlled by the controller or can be arranged in strings wherein control signals to a string are applicable for all of the light-emitting elements within the string. For example, like light-emitting elements may form a string thereof.

Detecting Devices

The one or more detecting devices provide a means for collecting information relating to the illumination being generated by the light-emitting elements, with this information being related to the luminous and spectral radiant flux output by the light-emitting elements. This collection of information related to luminous flux can be correlated to each of the colours, for example specific wavelength range of the light-emitting elements, thereby providing a means for evaluating the required intensity of each colour to be created by a particular light-emitting element based on desired criteria. The one or more detecting devices can additionally collect information relating to desired adjustments to the illumination, for example a user defined reduction in the overall illumination, while still maintaining the desired colour of illumination. Additional information that can be collected by the one or more detecting devices can be related to the junction temperatures of the specific coloured light-emitting elements, indications of desired luminous intensity and correlated colour temperatures (CCT), and the level and distribution of other light sources, for example.

There are many different designs for photometric and colourmetric sensors that can be incorporated into the present invention as the one or more detecting devices. Selection criteria that can be used to evaluate the applicability of a particular sensor can be based on for example, the dynamic range of operation of the sensor, the colours of light that can be detected by the sensor, the type of output provided by the sensor and the cost and size of the sensor. For example a particular detection device can be selected based on its wide dynamic range of operation, its tricolour sensing capabilities, the output of the sensor being in a digital format and that the sensor is inexpenrsive and small in size.

In one embodiment of the present invention, the detection device is a TAOS TCS230 colour sensor produced by Texas Advanced Optical Solutions, Inc. of Plano, Tex. This colour sensor is an 8-pin integrated circuit that offers a programmable gain light-to-frequency converter with filtered red, green, and blue channels for colourmetric measurements, as well as a broadband channel with approximately CIE $V(\lambda)$ spectral responsivity for photometric measurements. This colour sensor can be directly interfaced with a microcontroller or computing system, where its variable frequency output and programmable gain can provide an effective 18-bit dynamic range for each channel without the need for the incorporation of an analog-to-digital converter. It would be readily understood by a worker skilled in the art that other devices can be used as the one or more detecting devices. In addition, a lighting system may comprise a variety of different types of detecting devices therein to provide various photometric measurements, for example.

Computing System

The computing system collects the information from the one or more detecting devices and determines a collection of control parameters to be used by the controller in order to determine control signals for transmission to the light-emitting elements thereby controlling the illumination produced by the light-emitting elements. Essentially, the computing system linearises the information from the detecting devices, which is inherently non-linear, into control parameters that can be used by the controller which operates under an implicit assumption that the process being controlled is linear. The computing system can be any computational device that would provide the desired functionality and the desired computational speed, in order to enable real time adjustment of the illumination produced by the plurality of light-emitting elements. In addition, further consideration can be based on the size and cost of the computing system. In one embodiment of the invention, the computing system is a microcontroller. Other types of computing systems that would be appropriate for incorporation into the illumination system according to the present invention, would be readily understood by a worker skilled in the art.

The evaluation of an analytic or numerical algorithm that can provide the computing system with the desired functionality can be difficult and would be dependent on the amount of input information and the desired types of output required after computation. As such the evaluation of this algorithm can be tedious and time consuming.

In one embodiment of the present invention, a neural network is incorporated into the computing system, since a neural network can be used as a universal approximator capable of representing any continuously differentiable bounded function. In addition, a neural network as described by for example Haykin, S., Neural Networks: A Comprehensive Foundation, Second Edition, Prentice Hall, 1999, can represent a non-linear multivariate function with a minimum of computing resources. The neural network can be a radial basis function (RBF), a generalised radial basis function (GRBF), or other format of a neural network, as would be readily understood by a worker skilled in the art. The neural network represents a multidimensional function and can provide feedback signals needed to maintain constant chromaticity, for example. It may not be necessary or even desirable to have an analytic expression for the evaluation function, since a neural network can be trained to learn the function based on example input data and known or desired output data. The network can therefore be trained on the "factory floor" using a predetermined set of inputs, for example, intensity and chromaticity settings and the desired responses or control parameters to be determined. The neural network can implicitly learn the multidimensional function defined by the detecting device(s) and the characteristics of the light-emitting elements of an illumination system. As such, this can provide a flexible solution that can be essentially independent of LED manufacturing tolerances and binning parameters.

Figure 2:
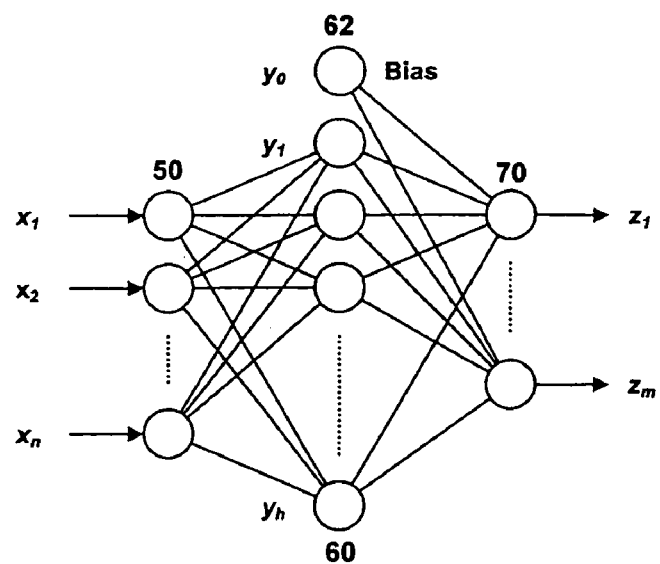
FIG. 2 is a schematic of a neural network based on radial basis functions according to one embodiment of the present invention.

In one embodiment of the present invention, the neural network is a radial basis function (RBF) as illustrated in FIG. 2. The RBF network is a feed-forward architecture with an input layer 50, one hidden layer 60, and an output layer 70. The input layer has n neurons, corresponding to the n elements of the input vector x. The hidden layer has h neurons and one bias neuron 62, with each input neuron fully connected to the h hidden layer neurons. Each hidden layer neuron (including the bias neuron) is connected to the m output neurons. Each output layer neuron represents one of m possible outputs for the input vector. In operation, an arbitrary input vector x is presented to the RBF network. Each hidden layer neuron computes its output, and the results are presented to the output layer. Each output layer neuron performs a linear weighted summation of the hidden layer neuron outputs. The input vector x is thereby nonlinearly mapped to the output vector z. The number of hidden neurons can vary depending on the complexity of the multidimensional function to be approximated. For the above description, a neuron is a simplified computational model of a biological neuron, which can be thought of as a non-linear amplifier, typically with a gain of unity or less.

As would be known to a worker skilled in the art, the training of a radial basis function neural network comprises determining the centres and widths of the hidden layer neuron activation functions, and determining the weights needed for the output layer neurons.

There are numerous training strategies, ranging from selecting hidden neuron centres at random from a training set of input vectors as defined by Lowe, D., Adaptive Radial Basis Function Nonlinearities and the Problem of Generalization, First IEEE International Conference on Artificial Networks, 1989, to applying regularisation theory as defined by Leonardis, A., and Bishchof, A., An Efficient MDL-Based Construction of RBF Networks, Neural Networks, 1998.

Controller

The controller receives a number of control parameters from the computing system, and based on these control parameters the controller evaluates the control signals that are to be transmitted to the light-emitting elements thereby controlling the illumination produced thereby. These control signals are in the form of current modifications, which result in the adjustment of the illumination produced by the light-emitting elements.

In one embodiment of the present invention, the controller is a proportional integral-derivative (PID) controller. The control parameters provided by the computing system are representative of a linearisation of the detection device signals, wherein this form of control signals is compatible with a PID controller due to the implicit assumption that the process being controlled by this form of controller is linear in nature.

In one embodiment of the present invention, the controller can be integrated into the computing system thereby enabling the generation of the control signals by the computing system directly.

EXAMPLES

Example 1

Figure 3:
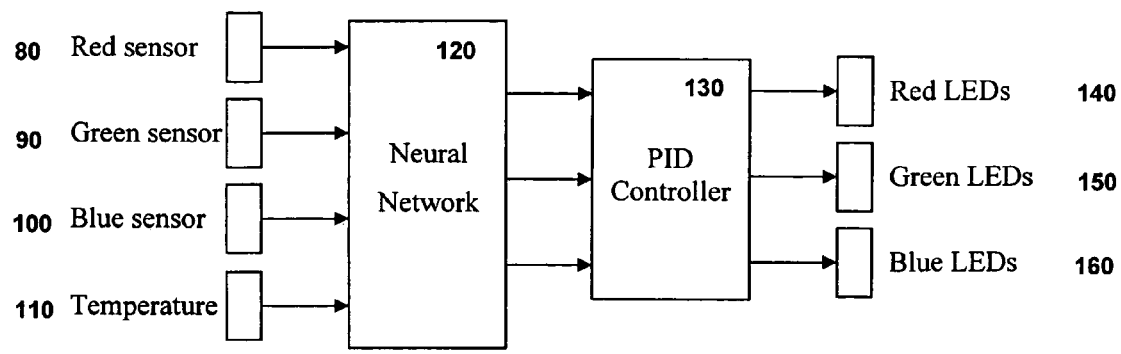
FIG. 3 illustrates the components of an illumination system according to one embodiment of the present invention.

In one embodiment and with reference to FIG. 3, the illumination system comprises light-emitting elements producing illumination having colours of red 140, green 150 and blue 160, detecting devices enabling the evaluation of the illumination intensities of the colours red 80, green 90 and blue 100 together with information relating to the junction temperatures 110 of the light-emitting elements. The computing system is a neural network 120 which is trained with known input data and desired responses using supervised learning techniques such that it can automatically determine the non-linear multivariate function representing the desired hyperplane. In operation, the neural network essentially linearises the sensor signals as input to a conventional proportional integral-derivative (PID) controller 130 which provides the control signals, in the form of current variations to the light-emitting elements in order to maintain constant luminous intensity and chroma.

Example 2

Figure 4:
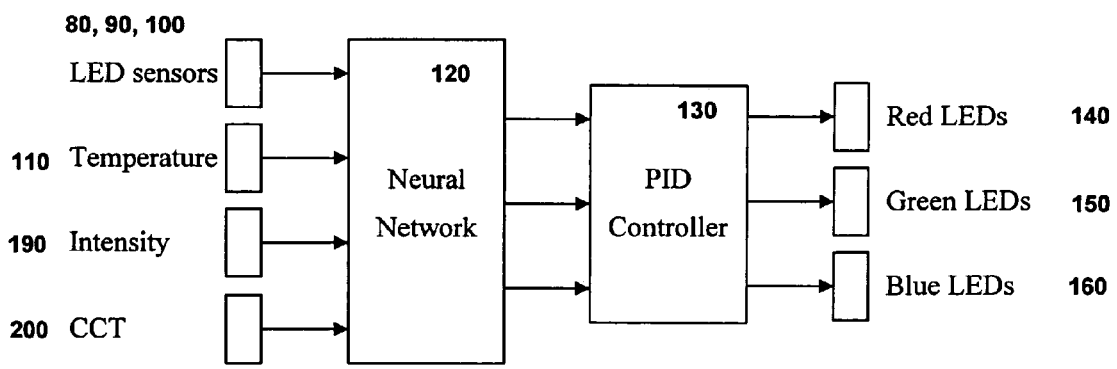
FIG. 4 illustrates the components of an illumination system according to another embodiment of the present invention.

In another embodiment and with reference to FIG. 4, the illumination system comprises the elements outlined in Example 1, and further comprises detecting devices which enable the input of user requests regarding desired luminous intensity 190 and correlated colour temperature (CCT) 200. Optionally, an additional user-controlled input or detecting device can provide an indication of the desired chromaticity in a direction orthogonal to the blackbody locus to effect a desired change in tint of nominal "white" light without changing its correlated colour temperature, for example. In this embodiment, the neural network that is trained with appropriate known input data and desired responses such that the chroma is constrained to follow that of the blackbody locus in CIE 1976 u-v uniform chromaticity space to generate nominal "white" light at different correlated colour temperatures, or CCT.

Example 3

Figure 5:
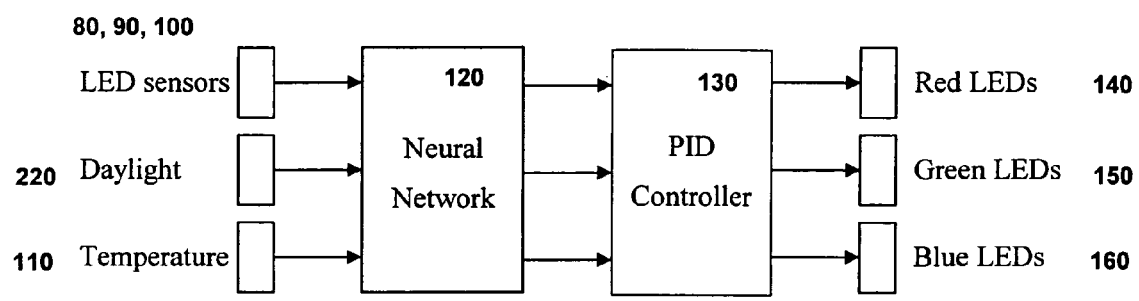
FIG. 5 illustrates the components of an illumination system according to another embodiment of the present invention.

In another embodiment and with reference to FIG. 5, the illumination system comprises the elements outlined in Example 1, and further comprises a further detection device in the form of a second colourimeter in order to monitor the intensity and approximate spectral distribution of ambient illumination due to the combination of the luminous flux emitted by the luminaire and daylight 220 and/or other light sources. In this embodiment, the neural network is trained such that the intensity and correlated colour temperature of the ambient illumination, or perceived lighting conditions which are a combination of the illumination from the illumination system and other sources, is held approximately constant or follows a user-defined correlation with the intensity and correlated colour temperature of daylight illumination. For example, if there was an increase in the ambient lighting conditions, due to an increase in the propagation of sunlight into an area, and based on the desired maintenance of a specific intensity and CCT, the illumination being produced by the illumination system can be automatically controlled and decreased thereby accounting for the increase in the illumination produced by the alternate illumination sources.

Example 4

In another embodiment the illumination system comprises the elements outlined in Example 1, wherein the polychromatic light source comprises red, green, blue, and amber light-emitting elements in order to provide "full spectrum" white light with enhanced colour rendering properties. In this embodiment, the neural network learns and performs the non-linear colour mapping from three colour sensor channels, for example red, green, and blue, to four light-emitting element control parameters for the controller to modify the illumination produced by the four colours of light-emitting elements.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. An illumination system comprising:
 a) a plurality of light-emitting elements for providing illumination having a variety of wavelengths,
 b) at least one detecting device for providing information regarding the illumination being created by the light-emitting elements;
 c) a computing system for receiving the information from the at least one detecting device and based on a predetermined set of parameters, determining a plurality of control parameters, said predetermined set of parameters defined by a multivariate function having a solution defining a hyperplane representing constant chromaticity for a given luminous intensity;
 d) a controller for receiving the plurality of control parameters and determining a set of control signals, wherein said control signals are sent to the light-emitting elements in order to control the illumination being created; and
 e) a power source for providing power to the illumination system.

2. The illumination system according to claim 1, wherein the at least one detecting device is capable of collecting information representing characteristics selected from the group comprising luminous and spectral radiant flux of the illumination, junction temperature of at least one of the plurality of light-emitting elements, desired luminous intensity, correlated colour temperature and ambient light.

3. The illumination system according to claim 1, wherein the at least one detecting device is a photometric sensor or a colourmetric sensor.

4. The illumination system according to claim 1, wherein the computing device is a microcontroller.

5. The illumination system according to claim 1, wherein a neural network is integrated into the computing system.

6. The illumination system according to claim 5, wherein the neural network is a radial basis function.

7. The illumination system according to claim 5, wherein the neural network is a generalised radial basis function.

8. The illumination system according to claim 1, wherein the controller is a proportional integral-derivative controller.

9. The illumination system according to claim 1, wherein controller functionality is integrated into the computing system.

10. The illumination system according to claim 1, wherein the plurality of light-emitting elements are arranged in one or more arrays.

11. The illumination system according to claim 10, wherein each of the one or more arrays are individually controlled by the controller.

12. The illumination system according to claim 1, wherein the plurality of light emitting elements are individually controlled by the controller.

* * * * *